United States Patent
Gasser (10) Patent No.: US 10,719,366 B1
(45) Date of Patent: Jul. 21, 2020

(54) DYNAMIC AND SELECTIVE HARDWARE ACCELERATION

(71) Applicant: Amazon Technologies, Inc., Seattle, WA (US)

(72) Inventor: Timothy David Gasser, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 15/658,221

(22) Filed: Jul. 24, 2017

(51) Int. Cl.
*G06F 9/50* (2006.01)
*G06F 9/445* (2018.01)

(52) U.S. Cl.
CPC ........ *G06F 9/5044* (2013.01); *G06F 9/44521* (2013.01)

(58) Field of Classification Search
CPC .................................................. G06F 9/5044
See application file for complete search history.

(56) References Cited

U.S. PATENT DOCUMENTS

| | | | |
|---|---|---|---|
| 7,603,540 | B2 | 10/2009 | Doering et al. |
| 9,038,072 | B2 | 5/2015 | Nollet et al. |
| 9,361,416 | B2 | 6/2016 | Fine et al. |
| 9,703,573 | B1 * | 7/2017 | Giefers ................. G06F 9/4484 |
| 2017/0277551 | A1 * | 9/2017 | Nicholson ........... G06F 9/44521 |
| 2018/0165082 | A1 * | 6/2018 | Batchelor ................. G06F 8/65 |
| 2019/0007334 | A1 * | 1/2019 | Guim Bernat .......... H04L 47/70 |

OTHER PUBLICATIONS

"BLAS (Basic Linear Algebra Subprograms)," Feb. 2017. Retrieved from: http://www.netlib.org/blas/, last updated Feb. 26, 2017, pp. 1-7.
"LAPACK—Linear Algebra PACKage," Jun. 2017, Retrieved from: http://www.netlib.org/lapack/, last updated Jun. 25, 2017, pp. 1-12.
Jeremy Fowers, et al., "A High Memory Bandwidth FPGA Accelerator for Sparse Matrix-Vector Multiplication," International Symposium on Field-Programmable Custom Computing Machines, May 2014. Retrieved from: https://www.microsoft.com/en-us/research/publication/a-high-memory-bandwidth-fpga-accelerator-for-sparse-matrix-vector-multiplication/, pp. 1-8.

(Continued)

*Primary Examiner* — Sisley N Kim
(74) *Attorney, Agent, or Firm* — Robert C. Kowert; Kowert, Hood, Munyon, Rankin & Goetzel, P.C.

(57) ABSTRACT

Methods, systems, and computer-readable media for dynamic and selective hardware acceleration are disclosed. An indirection layer receives a plurality of computation calls generated by an application. The application and the indirection layer are executed by at least one processor of a computing device, and the application links to the indirection layer. The indirection layer determines whether to execute individual computation calls using the at least one processor or using the hardware accelerator. The indirection layer sends one or more of the computation calls and associated data to the hardware accelerator. The one or more of the computation calls are executed using the hardware accelerator, and one or more results are returned from the hardware accelerator to the indirection layer.

20 Claims, 9 Drawing Sheets

(56) References Cited

OTHER PUBLICATIONS

Kalin Ovtcharov, et al, "Accelerating Deep Convolutional Neural Networks Using Specialized Hardware," Microsoft Research, Feb. 2015. Retrieved from: https://www.microsoft.com/en-us/research/publication/accelerating-deep-convolutional-neural-networks-using-specialized-hardware/, pp. 1-4.
Srinidhi Kestur, et al., "BLAS Comparison on FPGA, CPU and GPU," IEEE Computer Society Symposium on VLSI, Jul. 2010. Retrieved from: https://www.microsoft.com/en-us/research/publication/blas-comparison-on-fpga-cpu-and-gpu/, pp. 1-6.
Jason Brownlee, "A Gentle Introduction to Scikit-Learn: A Python Machine Learning Library," Apr. 2014. Retrieved from: http://machinelearningmastery.com/a-gentle-introduction-to-scikit-learn-a-python-machine-learning-library/, pp. 1-12.

\* cited by examiner

DYNAMIC AND SELECTIVE HARDWARE ACCELERATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for dynamic and selective hardware acceleration are described. Using the techniques described herein, a hardware accelerator may be used to accelerate computational tasks on a dynamic and selective basis. The hardware accelerator may represent a field-programmable gate array (FPGA), application-specific integrated circuit (ASIC), or other specialized hardware. On a computing device that includes one or more processors such as central processing units (CPUs), an application may be executed that generates calls to perform computational tasks. The application may link to an indirection layer that is also executed using the CPU and that receives the calls. The indirection layer may decide whether to dispatch the calls to the accelerator or instead to execute the calls using the CPU. In one embodiment, such a decision may be made on a call-by-call basis, e.g., based on the size of the data associated with the call and/or on the estimated time to complete the task using the accelerator in comparison to the estimated time using the CPU. For calls that are kept on the CPU, the calls may be executed using a domain-specific library, and the indirection layer may offer a similar interface as the domain-specific library. Instead of having to program an FPGA or design an ASIC, application developers may merely link to the indirection layer rather than the domain-specific library in order to take advantage of the selective hardware acceleration. In one embodiment, the indirection layer may dispatch the same calls to both the accelerator and the CPU in order to perform unit testing of the results. The accelerator may be accessed by the CPU over a local bus (e.g., within the same computing device) or may instead be implemented in a different computing device that is accessed over a network connection. In one embodiment, the accelerator may be part of a virtual compute instance that is provisioned from a multi-tenant provider network. If the accelerator is an FPGA, the programming for the FPGA may be selected from a marketplace (e.g., one associated with the provider network). Numerous domains may be suitable for acceleration using these techniques, such as linear algebra operations, fast Fourier transforms, digital signal processing, solution of differential equations, cardinality estimation, hashing, other forms of scientific and high-performance computing, and so on.

Figure 1:
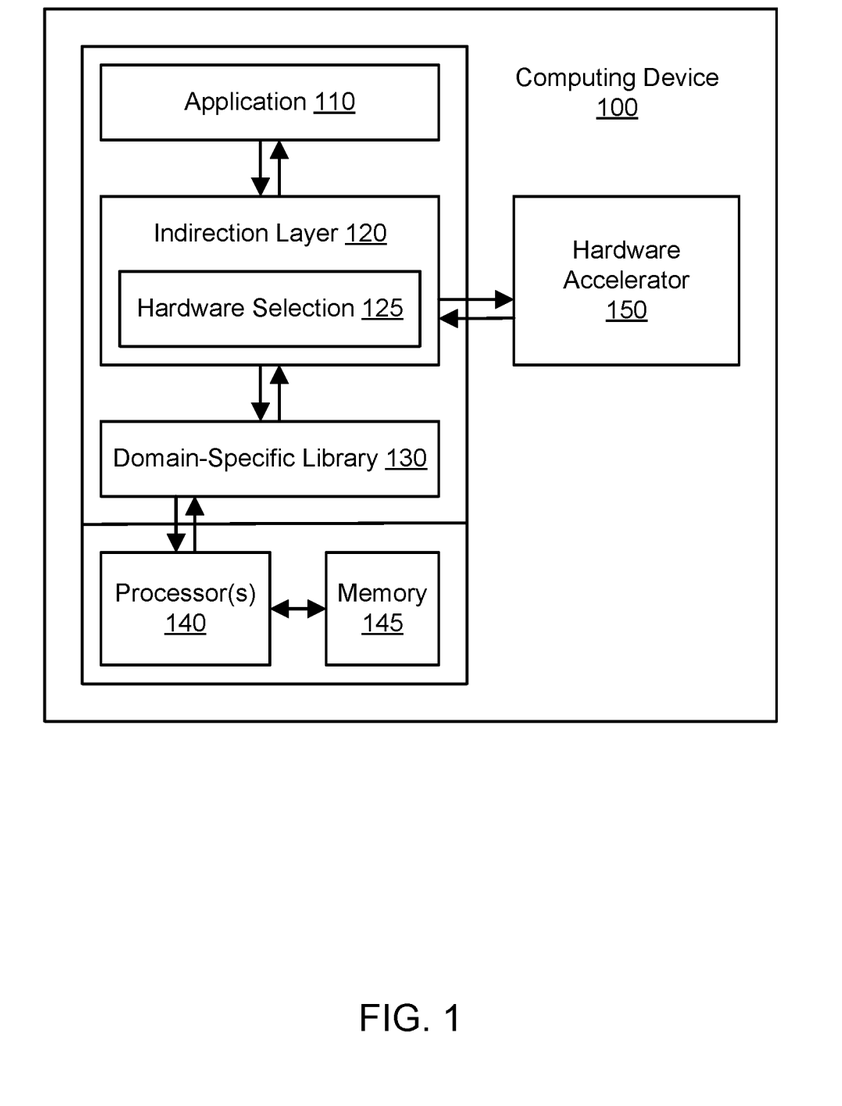
FIG. 1 illustrates an example computing device for dynamic and selective hardware acceleration, according to one embodiment.

FIG. 1 illustrates an example computing device for dynamic and selective hardware acceleration, according to one embodiment. A computing device 100 may include one or more processors 140 that interact with at least one memory 145 to execute instructions. The processor(s) 140 may also be referred to collectively herein as a central processing unit (CPU), but the CPU may represent one or more processors and/or one or more processor cores. The computing device 100 may also include a hardware accelerator 150. In one embodiment, the hardware accelerator 150 may represent a field-programmable gate array (FPGA). In one embodiment, the hardware accelerator 150 may represent an application-specific integrated circuit (ASIC). In one embodiment, the hardware accelerator 150 may represent other specialized hardware, e.g., for performing computational tasks in parallel and/or for implementing same-instruction-multiple-data (SIMD) computation. In various embodiments, the accelerator 150 may be integrated with the processor(s) 140 (e.g., on the same die) or the accelerator may be accessed by the processor(s) over a local bus (e.g., within the same computing device 100). As will be discussed below, in one embodiment the accelerator 150 may instead be implemented in a different computing device that is accessed over a network connection. As will also be discussed below, in one embodiment the computing device 100 may represent a virtual compute instance that is provisioned from a multi-tenant provider network on behalf of a client of that provider network. The computing device 100 may be implemented by the example computing device 3000 illustrated in FIG. 9.

For many tasks, the use of an FPGA or ASIC may yield significant performance advantages over the use of a CPU to perform the same tasks. In a conventional scenario, to make use of an FPGA, a software developer may be required to learn how to program an FPGA and actually develop and test specialized FPGA programming. Such tasks represent a high barrier to entry for many software developers. Similarly, designing and manufacturing an ASIC may represent a high barrier. Instead of having to program an FPGA or design an ASIC, an application developer may easily link an application 110 to an indirection layer 120 instead of to a domain-specific library 130, and the indirection layer 120 may make use of the hardware accelerator 150 to accelerate computational workloads. In a conventional scenario, the application 110 would typically link to the domain-specific library 130. The library 130 may offer functionality (e.g., executable program code) in a particular domain such as linear algebra operations, fast Fourier transforms, digital signal processing, solution of differential equations, cardinality estimation, hashing, other forms of scientific and high-performance computing, and so on. The same or similar functionality may also be implemented in the hardware accelerator 150. The indirection layer 120 may offer a similar interface as the domain-specific library 130 so that the developer of the application 110 need not necessarily change the program code of the application in order to take advantage of the hardware accelerator 150. By simply linking an application 110 to the indirection layer 120 instead of the library 130, a software developer may achieve significantly faster processing of computational tasks by gaining access to a hardware accelerator 150 that implements the same or similar functionality as the library 130.

The application 110 may generate calls or instructions to execute computational tasks, e.g., using an interface exposed by the indirection layer 120 that is similar to that of the library 130. Each call may be associated with data that represents input to one or more computations. Such calls and their input data may be intercepted by the indirection layer 120 using a façade pattern, and the indirection layer may perform hardware selection 125 to determine whether or not to make use of the hardware accelerator 150 or the processor(s) 140 to execute the calls. From the application's point of view, the indirection layer 120 may act as a substitute for the domain-specific library 130. The indirection layer 120 may represent a library that offers the same or similar interface to applications as the domain-specific library 130. The indirection layer 120 may be referred to as a library or a substitute library. In one embodiment, the hardware acceleration may be performed on a selective basis: some calls may be dispatched to the accelerator 150, while other calls may be executed using the processor(s) 140. In one embodiment, the hardware acceleration may be performed on a dynamic basis: calls may be dispatched to the accelerator 150 or kept on the CPU based (at least in part) on a hardware selection made at run-time. In one embodiment, the hardware selection 125 may be made on a call-by-call basis. In one embodiment, the hardware selection 125 may be performed based (at least in part) on the size of the data associated with a particular call or on other characteristics of a particular call. In one embodiment, code profiling may be used to implement the hardware selection 125.

In one embodiment, the hardware selection 125 may be performed based (at least in part) the estimated time to complete the task using the accelerator 150 in comparison to the estimated time using the processor(s) 140. The estimated time of completion using the hardware accelerator may include the latency associated with dispatching calls across a local bus or a network. Due to this latency, smaller operations may often be kept on the CPU while larger operations may be dispatched to the accelerator. Machine learning techniques and/or testing of differently sized workloads may be used to estimate the completion time. For example, a small operation may be sent to the accelerator and also executed on the CPU, the time to completion may be recorded on both types of hardware. The size of the operation may be increased (e.g., doubled) until a threshold size is determined, beyond which it is deemed more efficient to send workloads to the hardware accelerator. Future workloads may be dispatched to the accelerator or kept on the CPU based (at least in part) on a comparison of their size to the threshold size. As another example, characteristics of calls to the accelerator and CPU may be recorded over time, and a classification algorithm (referred to as a classifier) may be trained on such recorded calls. The recorded characteristics may include the type of interconnect (e.g., local bus or Ethernet access), the accelerator or processor used to perform the computation, the time to reach a result, and so on. After being trained, the classifier may be employed for hardware selection 125 of calls in the future. In this manner, a model estimating completion time for calls may be built in an initial self-test mode and then refined with online training. In one embodiment, self-test or self-optimization techniques may be performed every time an FPGA hardware accelerator is reprogrammed to achieve a tradeoff between throughput and latency. In one embodiment, the indirection layer 120 may reprogram an FPGA hardware accelerator with a greater or lesser number of compute kernels or swap the current FPGA programming for different programming to achieve further optimization.

If a call and its associated data is dispatched to the accelerator 150 by the indirection layer 120, the computational task(s) associated with the call may be executed using the accelerator for the associated data, and results may be returned to the indirection layer and potentially back to the application 110. Similarly, if a call and its associated data is dispatched to the domain-specific library 130 by the indirection layer 120, the computational task(s) associated with the call may be executed using the processor(s) 140 for the associated data, and results may be returned to the indirection layer and potentially back to the application 110. In one embodiment, unit testing may be performed by dispatching the same call to both the accelerator 150 and the library 130 and comparing the results within some margin of error. In one embodiment, a newly programmed FPGA or new ASIC may be tested against a known baseline in a similar manner.

In one embodiment, the indirection layer 120 may keep track of calls that have been dispatched to the accelerator 150 and/or kept on the CPU. For example, the indirection layer 120 may store a total amount of computation (e.g., based on the size of data associated with calls) sent to the accelerator but not yet completed. If the amount of incomplete computation at the accelerator is higher than a threshold amount, then to avoid delays in processing, the indirection layer 120 may keep calls on the CPU until the accelerator's queue of work is smaller. Based on such knowledge of the accelerator's availability, the indirection layer 120 may optimize the hardware selection 125 by occasionally keeping calls on the CPU that otherwise would have been dispatched to the accelerator 150.

Figure 2:
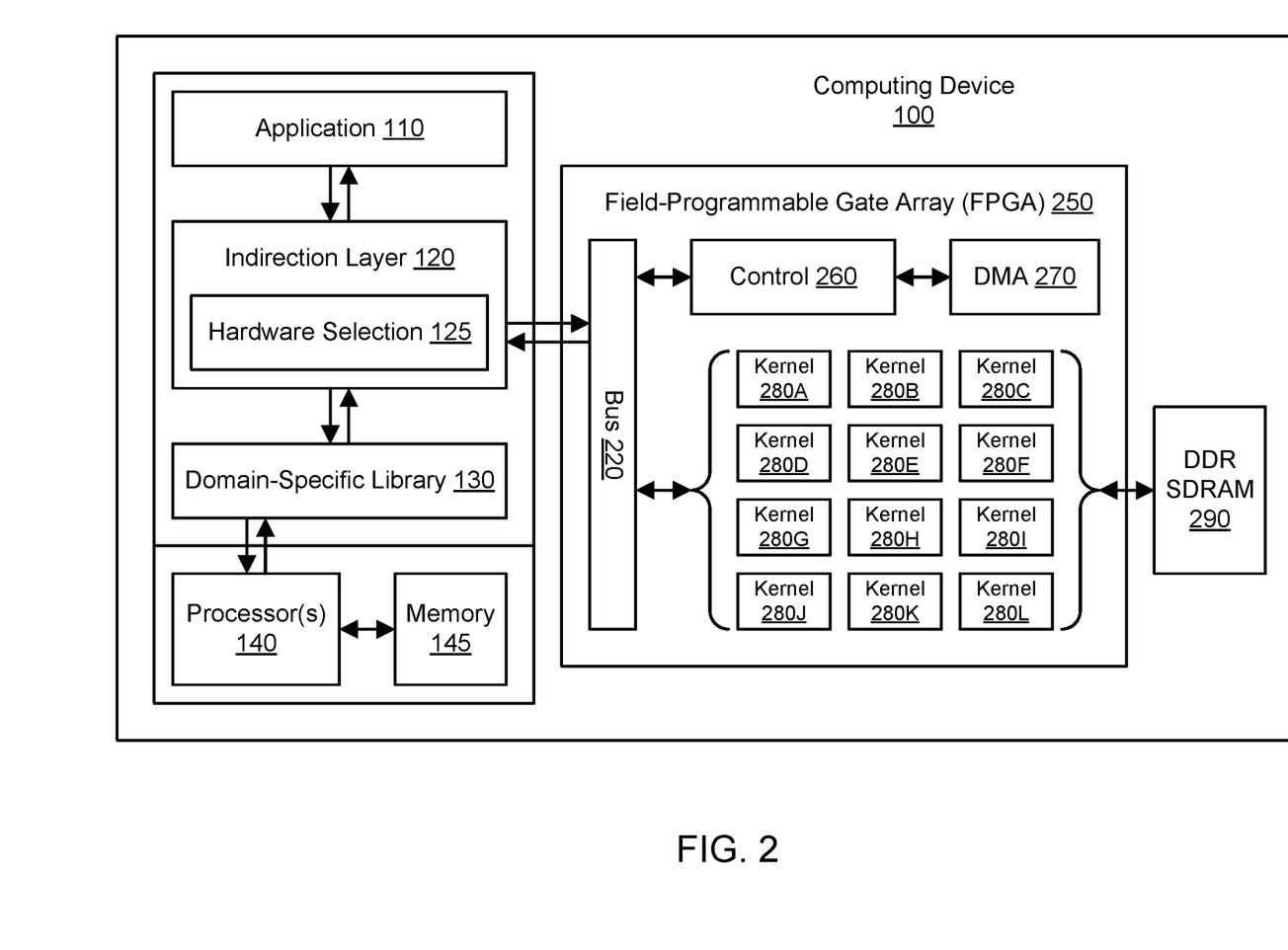
FIG. 2 illustrates further aspects of the example computing device for dynamic and selective hardware acceleration, including a field-programmable gate array (FPGA), according to one embodiment.

FIG. 2 illustrates further aspects of the example computing device for dynamic and selective hardware acceleration, including a field-programmable gate array (FPGA), according to one embodiment. As discussed above, in one embodiment the hardware accelerator 150 may represent an FPGA 250. As shown in FIG. 2, the FPGA 250 may represent an example of an FPGA architecture that may be used with the techniques for dynamic and selective hardware acceleration. Unlike a graphics processing unit (GPU) with fixed cores used for general-purpose computing, an FPGA may create new power-efficient hardware compute cores and run at a lower clock frequency. A properly configured FPGA may achieve superior performance over a GPU for the same power budget. Although the FPGA 250 represents an example configuration that is suitable for numerous computing domains, such as linear algebra, an FPGA may also be used with a more pipeline-like architecture, e.g., for domains like video transcoding and hashing.

The FPGA 250 may be programmed using a hardware description language (HDL), such as Verilog, that describes logic at a low level of abstraction in terms of wires, combinatorial functions, flip flops, and so on. Learning and using such a language may pose a high barrier for many software developers, e.g., the developer of the application 110. Even when programming an FPGA at a higher level of abstraction (e.g., in a programming language like C or C++), the verification and debugging of the logic may be time-consuming and may also pose a high barrier for many software developers. Additionally, the developer may be spared other time-consuming and expensive tasks such as creating an FPGA communications layer between the software running on the CPU and the hardware in the FPGA, creating software builds that link to the FPGA communications layer, verifying the FPGA kernel logic in simulation, optimizing the FPGA design to meet clock frequencies required for the application, and so on. The use of the indirection layer 120 may lower this barrier, such that a developer may have no need to learn or use an FPGA programming language or design an FPGA. Instead, a developer or other user may select an existing FPGA image that has been previously designed and tested for a particular problem domain (e.g., a domain associated with the domain-specific library 130). The selected FPGA image may be easily deployed to the FPGA 250 for use in dynamic and selective hardware acceleration, even for a developer who has little knowledge of the underlying hardware. In one embodiment, the user may select the FPGA image from a marketplace of FPGA images, e.g., with an agreement to pay a fee to a publisher of the selected image. In one embodiment, the user may select the computing device from a pool of available computing devices in a provider network, where the selected computing device includes a suitably configured FPGA.

The FPGA 250 may include an interface that allows for calls and results to be passed back and forth between the FPGA and the indirection layer 120 running on the processor(s) 140. As shown in the example of FIG. 2, the interface may include a bus 220. The bus 220 may be capable of receiving both control and bulk data from the indirection layer 120. The bus 220 may represent a local bus that permits components within the same computing device 100 to communicate. In one embodiment, the bus 220 may be implemented using peripheral component interconnect (PCI) or PCI Express (PCIe) technology. For example, the bus 220 may be implemented as a PCIe Gen3 interface of x8 or x16 size. The bus 220 may direct control information to a control block 260 and may direct bulk data (e.g., representing input for requested tasks) to a set of FPGA kernels such as kernels 280A-280L. The compute kernels 280A-280L may perform computation in a massively parallel manner. Each of the kernels may have a queue of work to be done, and the control block 260 may distribute the work among the kernels based (at least in part) on the knowledge of which kernels are idle and which are active. The control block 260 may subdivide work among multiple kernels.

The control block 260 may receive information about the size and type of operations being executed over the bus 220. For example, many linear algebra operations can be partitioned into parallel computations, such as a vector-matrix multiplication that can be seen as a series of dot products. Some operations may be blocking, such that further computations cannot proceed until a previous stage completes. In addition, the results of previous computations can be cached in memory such as DDR SDRAM 290 for quick access in future computations. In one embodiment, the control block 260 manages these operations.

The array of compute kernels 280A-280L may be allocated for each operation by the control block 260. The kernels 280A-280L may implement fine-grained SIMD computations as needed by the call dispatched by the indirection layer 120. Bulk data for processing can be sourced from the bus 220 or from previous results cached in DDR SDRAM 290. In one embodiment, each compute kernel has its own dedicated storage, analogous to CPU registers, and the kernels can access multiple gigabytes of SDRAM running at a high data rate bandwidth (e.g. 32-bits at 800 MHz to give 25 Gbps bandwidth).

In one embodiment, bulk data is moved around the system at the same time as the compute kernels 280A-280L are busy processing their data. One or more direct memory access (DMA) blocks 270 are programmed by the control block 260 to move data between the bus 220, compute kernel result storage, and DDR SDRAM 290 to cache intermediate results. The DMA blocks(s) 270 may assemble partitioned results from multiple kernels into a single memory location. These results may then be cached in DDR SDRAM 290 and/or sent over the bus 220 to the indirection layer 120 running on the processor(s) 140.

Figure 3:
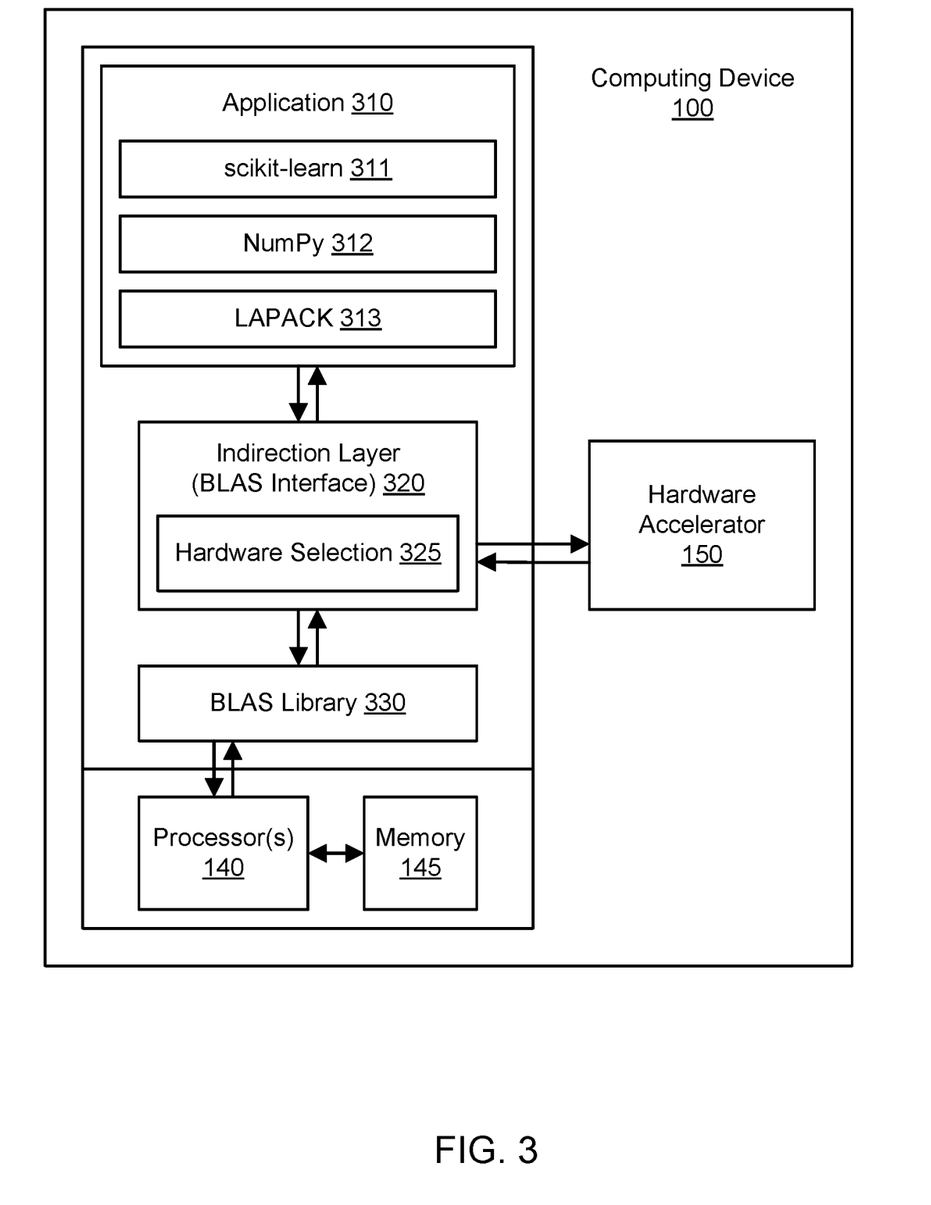
FIG. 3 illustrates further aspects of the example computing device for dynamic and selective hardware acceleration, including an example software stack whose calls can be accelerated, according to one embodiment.

FIG. 3 illustrates further aspects of the example computing device for dynamic and selective hardware acceleration, including an example software stack whose calls can be accelerated, according to one embodiment. As discussed above, the dynamic and selective hardware acceleration may be suited for use with numerous domains, including linear algebra operations, fast Fourier transforms, digital signal processing, solution of differential equations, cardinality estimation, hashing, other forms of scientific and high-performance computing, and so on. In the example of FIG. 3, the application 310 is associated with a scientific computing stack that includes numerous components. The software stack may include the open-source machine learning framework known as scikit-learn 311. The scikit-learn component 311 may include support for supervised and unsupervised algorithms as well as dimensionality reduction, imputation, and other tasks. In one embodiment, the software stack may include a component called Scipy that offers a range of scientific computing routines, including linear algebra, signal processing, fast Fourier transforms, integration, and optimization. In one embodiment, the software stack may include a component called Pandas that gives a dataframe interface to easily manipulate data in a table format. In one embodiment, the software stack may include a component called Matplotlib that offers basic plotting features. The software stack may include a Python-based scientific computing package called NumPy 312 that offers a powerful N-dimensional array object, tools for integrating C/C++ and Fortran code, and capabilities for linear algebra, Fourier transforms, and random numbers. The software stack may include a Fortran library called LAPACK 313 that implements matrix decompositions. LAPACK 313 may use calls to basic linear algebra subprograms (BLAS) to implement higher-level matrix operations.

In one embodiment, the application 310 may generate calls to an interface associated with BLAS in order to implement linear algebra tasks. A BLAS library 330 may represent a set of reference implementations for linear algebra operations. The implementations may be divided into levels one to three, respectively covering vector-vector, matrix-vector, and matrix-matrix operations. In a conventional scenario, the application 310 would link to the BLAS library 330 and call the interface associated with that library. Using the computing device 100 that offers dynamic and selective hardware acceleration, the application 310 may instead link to an indirection layer 320 that offers the same or similar BLAS interface as the library 330. The hardware accelerator 150 may implement the same or similar functionality as the BLAS library 330. Upon receiving a call from the application 310, the indirection layer 320 may pass the call to the hardware accelerator 150 and/or to the traditional BLAS implementation 330 running on the processor(s) 140. The indirection layer 320 may perform hardware selection 325 as discussed above with respect to FIG. 1. The indirection layer 320 with the BLAS interface may offer selective and incremental replacement of BLAS-based routines with FPGA-accelerated or ASIC-accelerated algorithms, such that some calls may be dispatched to the hardware accelerator while some calls may remain on the CPU.

Figure 4:
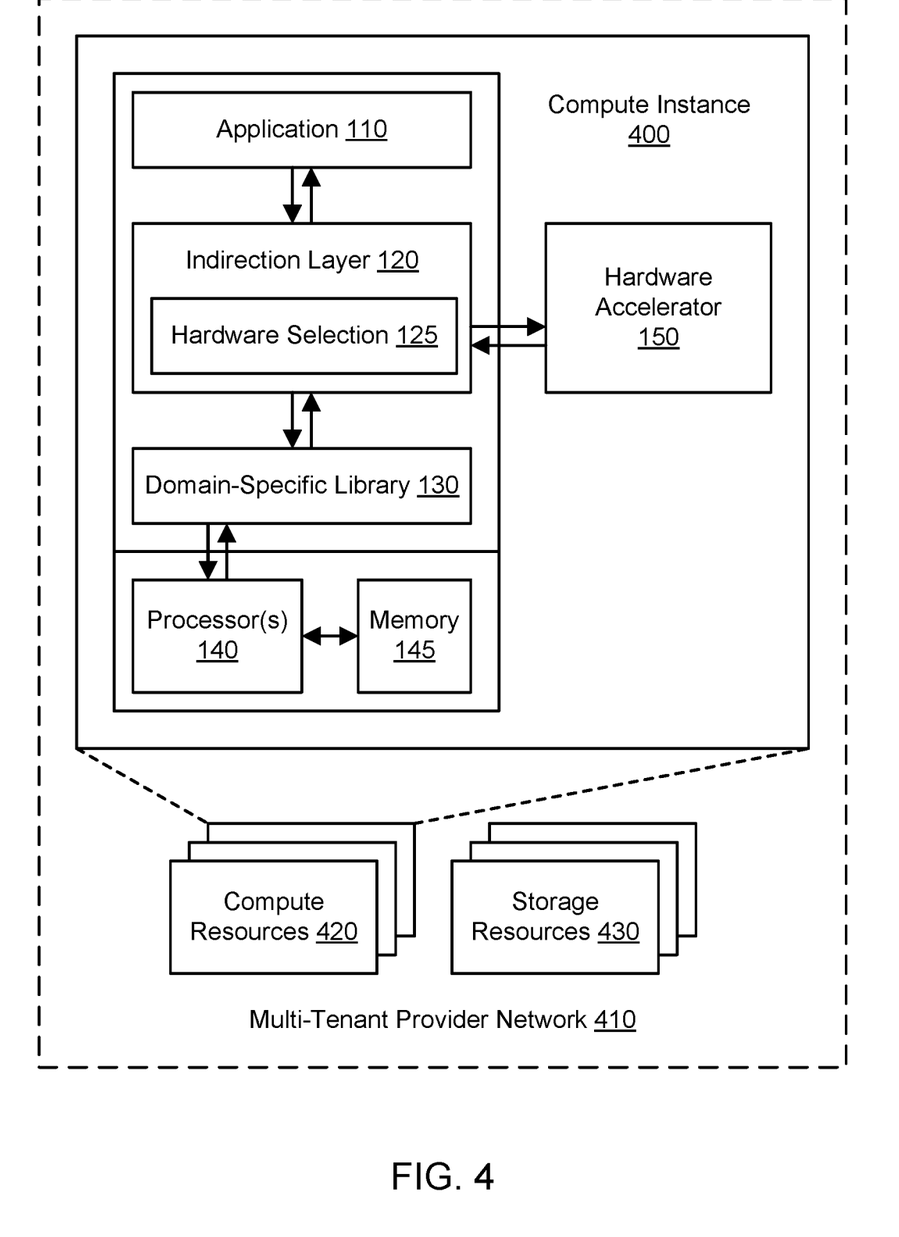
FIG. 4 illustrates an example computing instance provisioned in a multi-tenant provider network for dynamic and selective hardware acceleration, according to one embodiment.

FIG. 4 illustrates an example computing instance provisioned in a multi-tenant provider network for dynamic and selective hardware acceleration, according to one embodiment. In one embodiment, the computing device that implements dynamic and selective hardware acceleration may represent a physical compute instance or virtual compute instance offered in a multi-tenant provider network 410. A user may select the compute instance 400 from a pool of available compute instances in the provider network. In one embodiment, the selected instance may be of an instance type that includes an FPGA or ASIC suitable for accelerating computational tasks. The user may select the instance 400 based (at least in part) on its inclusion of a suitable FPGA or ASIC. In one embodiment, the instance 400 may be preconfigured with FPGA programming suitable for a particular computing domain such as linear algebra using BLAS-compatible routines. In one embodiment, the user may select an FPGA image from a repository of images, e.g., for a particular computing domain such as linear algebra using BLAS-compatible routines.

The provider network 410 may be set up by an entity such as a business organization or a public-sector organization to provide one or more services (such as various types of cloud-based computing or storage) to a set of clients via the Internet and/or other networks. The provider network 410 may include numerous data centers hosting various resource pools, such as collections of physical and/or virtualized computer servers, storage devices, networking equipment and the like (e.g., implemented using computing system 3000 described below with regard to FIG. 9), that may be used to implement and distribute the infrastructure and services offered by the provider network. In some embodiments, the provider network 410 may provide compute resources 420, such as a set of compute instances that can be provisioned on behalf of clients of the provider network and then used by those clients. The compute resources 420 may include virtual compute instances that are implemented by one or more network-accessible compute virtualization services. In some embodiments, the provider network 410 may provide storage resources 430, such as a set of storage instances that can be provisioned on behalf of clients of the provider network and then used by those clients. The storage resources 430 may be implemented by one or more network-accessible storage services, such as a block-based storage service, key-value based data stores, or various types of database systems.

The provider network 410 may include numerous network-based services that interact to offer resources to clients. Client devices may access these various services offered by the provider network 410 via one or more networks. Likewise, network-based services of the provider network 410 may themselves communicate and/or make use of one another to provide different services. For example, compute resources 420 offered to clients in units called "instances," such as virtual or physical compute instances, may make use of particular data volumes, thus providing virtual block storage for the compute instances. The provider network 410 may implement or provide a multi-tenant environment such that multiple clients (e.g., using client devices outside the provider network) may access or use a particular resource in a substantially simultaneous manner. The provider network 410 may thus represent a multi-tenant provider network. The clients, users, or customers of the provider network 410 may represent persons, businesses, other organizations, and/or other entities. The client devices associated with clients may be distributed over any suitable locations or regions.

In one embodiment, the provider network 410 may offer virtual compute instances with varying computational and/or memory resources. In one embodiment, each of the virtual compute instances may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using a component such as a resource manager, an instance type may be selected for a client, e.g., based (at least in part) on input from the client. For example, a client may choose an instance type from a predefined set of instance types that include a suitable FPGA or ASIC for a computing domain associated with the application 110. As another example, a client may specify the desired resources of an instance type, and the resource manager may select an instance type based on such a specification.

A resource manager or other component of the provider network 410 may provision virtual compute instances with hardware accelerators, e.g., based on the specified requirements (including any specified instance types and accelerator domains). As used herein, provisioning a virtual compute instance generally includes reserving resources (e.g., computational and memory resources) of an underlying server for the client (e.g., from a pool of available physical compute instances and other resources), installing or launching required software (e.g., an operating system), and making the virtual compute instance available to the client for performing tasks specified by the client. For a particular client, a virtual compute instance may be provisioned of the instance type selected by or for the client, and the virtual compute instance may be provisioned with a hardware accelerator selected by or for the client.

A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement virtual compute instances in various embodiments, including general purpose or special purpose computer servers, storage devices, network devices and the like. In some embodiments, client devices may be configured (and/or authorized) to direct network traffic to a virtual compute instance. In various embodiments, virtual compute instances may attach or map to one or more data volumes provided by a storage service in order to obtain persistent storage for performing various operations. Virtual compute instances may operate or implement a variety of different platforms, such as application server instances, Java™ virtual machines (JVMs) or other virtual machines, general purpose or special-purpose operating systems, platforms that support various interpreted or compiled programming languages such as Ruby, Perl, Python, C, C++ and the like, or high-performance computing platforms) suitable for performing client applications, without for example requiring the client devices to access an instance.

In some embodiments, virtual compute instances may be offered in different resource pools based on different reservation modes, such as long-term reservations, on-demand reservations, spot reservations, and so on. In some embodiments, virtual compute instances may have different instance types or configurations based on expected uptime ratios. The uptime ratio of a particular virtual compute instance may be defined as the ratio of the amount of time the instance is activated to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and the client may pay a discounted hourly usage fee in accordance with the associated pricing policy. If the client expects to have a steady-state workload that requires an instance to be up most of the time, then the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances configured for a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In some embodiments, particular instance types for virtual compute instances may be associated with default configurations for FPGAs or ASICs. For example, some instance types may be configured without an FPGA as a default configuration, while other instance types designated for scientific computing may be designated with particular FPGA configurations as a default configuration. Configurations of virtual compute instances may also include their location in a particular data center or availability zone, geographic location, and (in the case of reserved compute instances) reservation term length.

Client devices may convey network-based service requests to the provider network 410 via one or more external network(s). In various embodiments, the external network(s) may encompass any suitable combination of networking hardware and protocols necessary to establish network-based communications between client devices and the provider network 410. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given client device and the provider network 410 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 410. It is noted that in some embodiments, client devices may communicate with provider network 410 using a private network rather than the public Internet.

Figure 9:
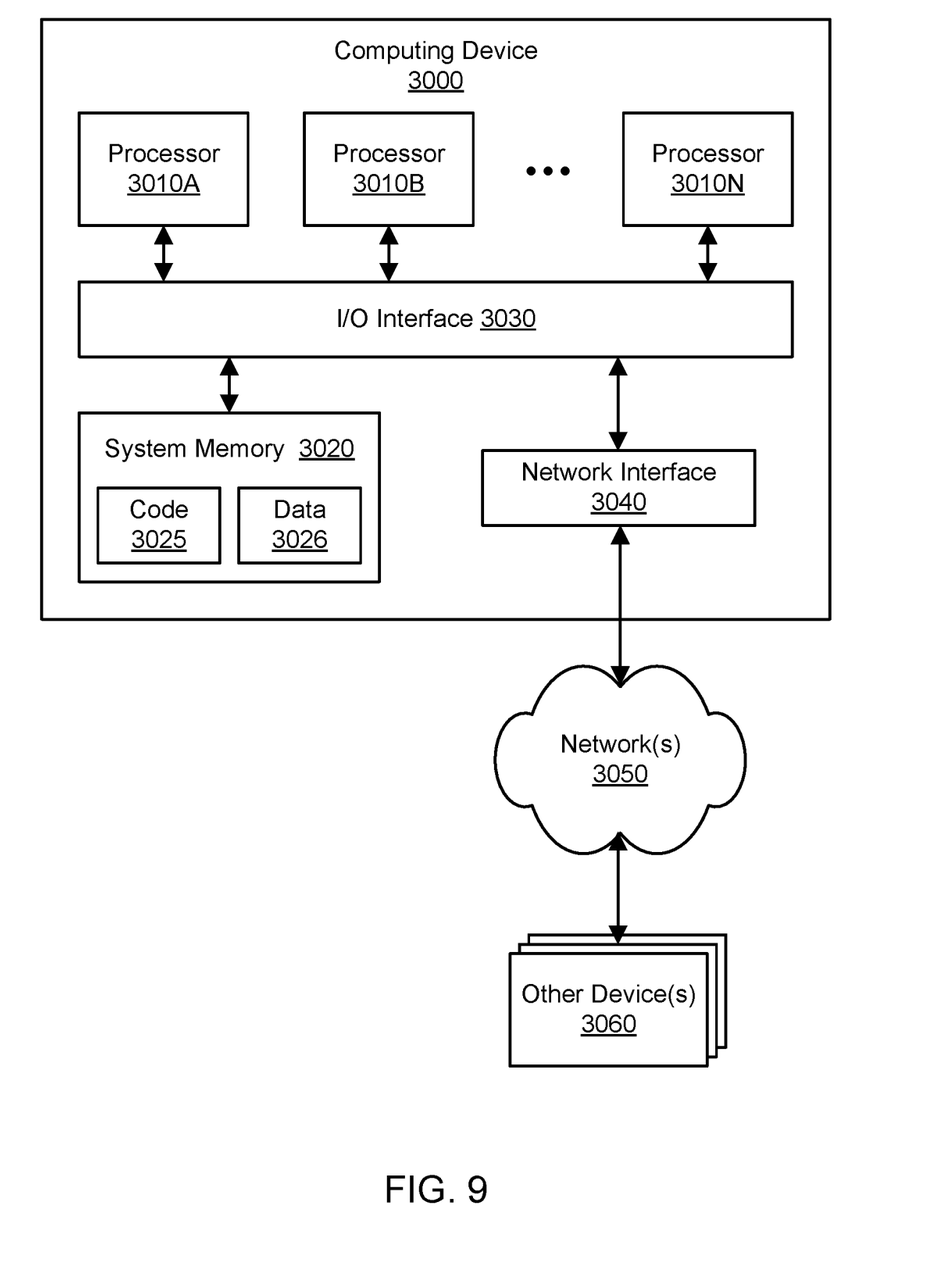
FIG. 9 illustrates an example computing device that may be used in some embodiments.

The provider network 410 may include a plurality of computing devices, any of which may be implemented by the example computing device 3000 illustrated in FIG. 9. In various embodiments, portions of the described functionality of the provider network 410 may be provided by the same computing device or by any suitable number of different computing devices. If any of the components of the provider network 410 are implemented using different computing devices, then the components and their respective computing devices may be communicatively coupled, e.g., via a network. Each of the illustrated components (such as the compute resources 420 and storage resources 430) may represent any combination of software and hardware usable to perform their respective functions.

Figure 5:
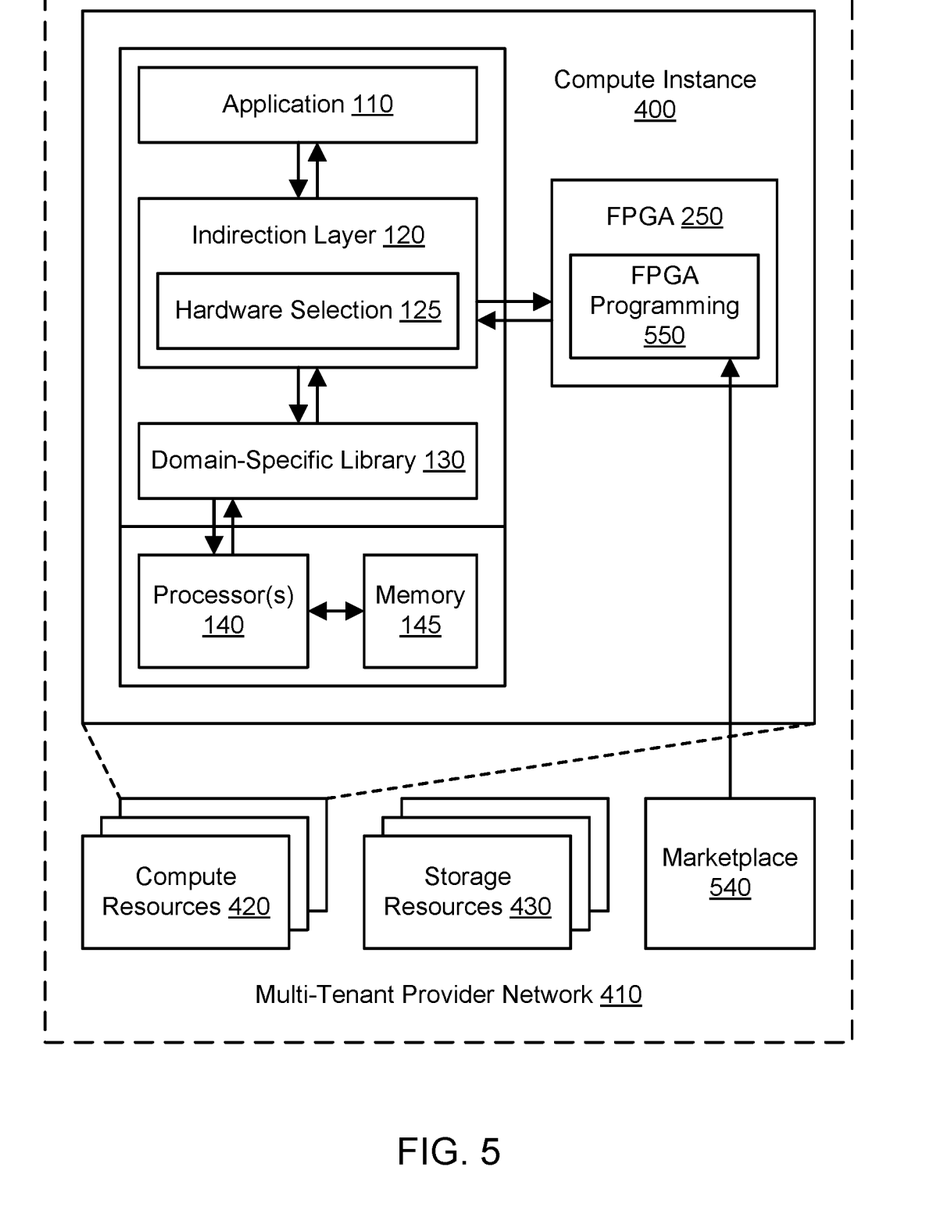
FIG. 5 illustrates further aspects of the example computing instance for dynamic and selective hardware acceleration, including selection of FPGA programming from a marketplace associated with the provider network, according to one embodiment.

FIG. 5 illustrates further aspects of the example computing instance for dynamic and selective hardware acceleration, including selection of FPGA programming from a marketplace associated with the provider network, according to one embodiment. In one embodiment, a user may select the FPGA image for FPGA programming 550 from a marketplace 540 of FPGA images. The marketplace 540 may be associated with the provider network 410. The marketplace 540 may offer FPGA images for various purposes, such as various scientific computing domains, and where the images have been previously designed and tested for those purposes. For example, the FPGA programming 550 may be listed as implementing BLAS-compatible functionality and may be selected on that basis. The FPGA images in the marketplace may be supplied by various publishers, potentially including third parties and/or the entity that operates the provider network 410. In selecting the FPGA programming 550 from the marketplace, the user may enter into an agreement to pay a fee to the publisher of the selected programming. The FPGA 250 may be configured with the selected FPGA programming at the time the compute instance 400 is provisioned or at any suitable point thereafter. In one embodiment, a set of different FPGA instances may be leased or purchased from the marketplace 540, potentially designed for different problem domains, and the FPGA 250 may be switched from one of the images to another of the images at runtime with minimal delay. In this manner, the same physical FPGA 250 may be used for different types of computation by the same compute instance 400. In one embodiment, the FPGA programming 550 may be provided by the developer of the application 110 instead of being leased or purchased from the marketplace 540. In one embodiment, the developer of the application 110 may also provide a custom indirection layer 120 to interact with the FPGA programming 550.

Figure 6:
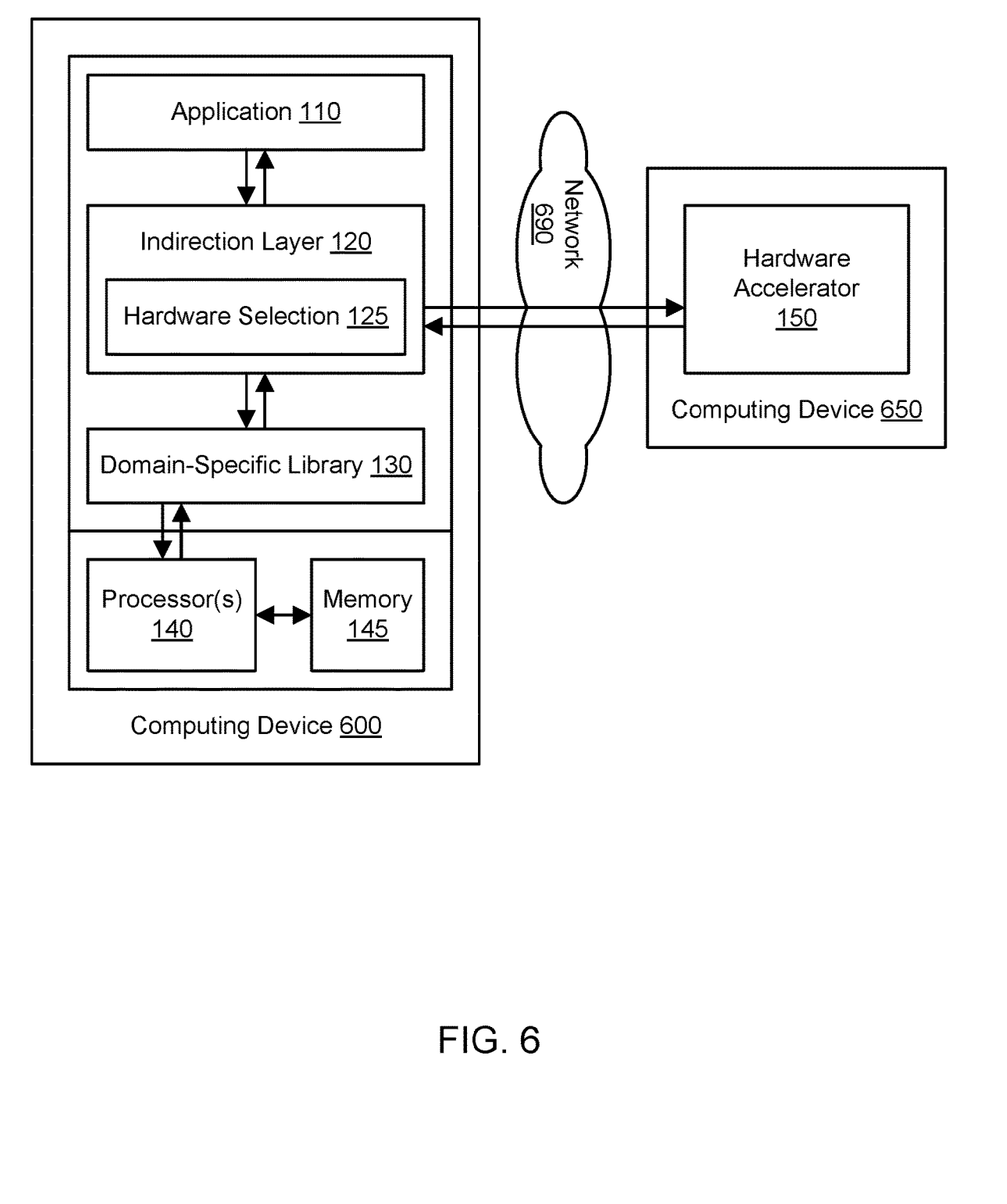
FIG. 6 illustrates example computing devices that communicate over a network to implement dynamic and selective hardware acceleration, according to one embodiment.

FIG. 6 illustrates example computing devices that communicate over a network to implement dynamic and selective hardware acceleration, according to one embodiment. As discussed above, in various embodiments the hardware accelerator 150 may be integrated with the processor(s) 140 (e.g., on the same die) or the accelerator may be accessed by the processor(s) over a local bus (e.g., within the same computing device 100). In one embodiment, as shown in the example of FIG. 6, the indirection layer 120 may run on one computing device 600, and the hardware accelerator 150 may be implemented in a different computing device 650 that is accessed over a network 690. The computing devices 600 and 650 may be implemented by the example computing device 3000 illustrated in FIG. 9. In various embodiments, the computing device 600 with the indirection layer 120 and the computing device 650 with the accelerator 150 may be located in the same rack, in the same data center, or in different data centers. In some embodiments, the computing device 600 with the indirection layer 120 and/or the computing device 650 with the accelerator 150 may be provisioned from compute resources 420 of a provider network 410. The network 690 may represent one or more publicly accessible networks (e.g., the Internet) and/or one or more privately accessible networks. To communicate over the network 690, the two computing devices 600 and 650 may use network adapters that implement, for example, TCP/IP transmission. Using similar techniques as discussed above, the indirection layer 120 may pass both control information and bulk data to the accelerator 150 over the network 690, and the accelerator may pass the results of the requested operations back to the indirection layer. Because use of the network 690 may increase latency in comparison to the use of a local bus, latency testing of differently sized workloads may determine that the threshold size of data for calls to be dispatched to the accelerator 150 may be larger in the network configuration than in the local bus configuration.

Figure 7:
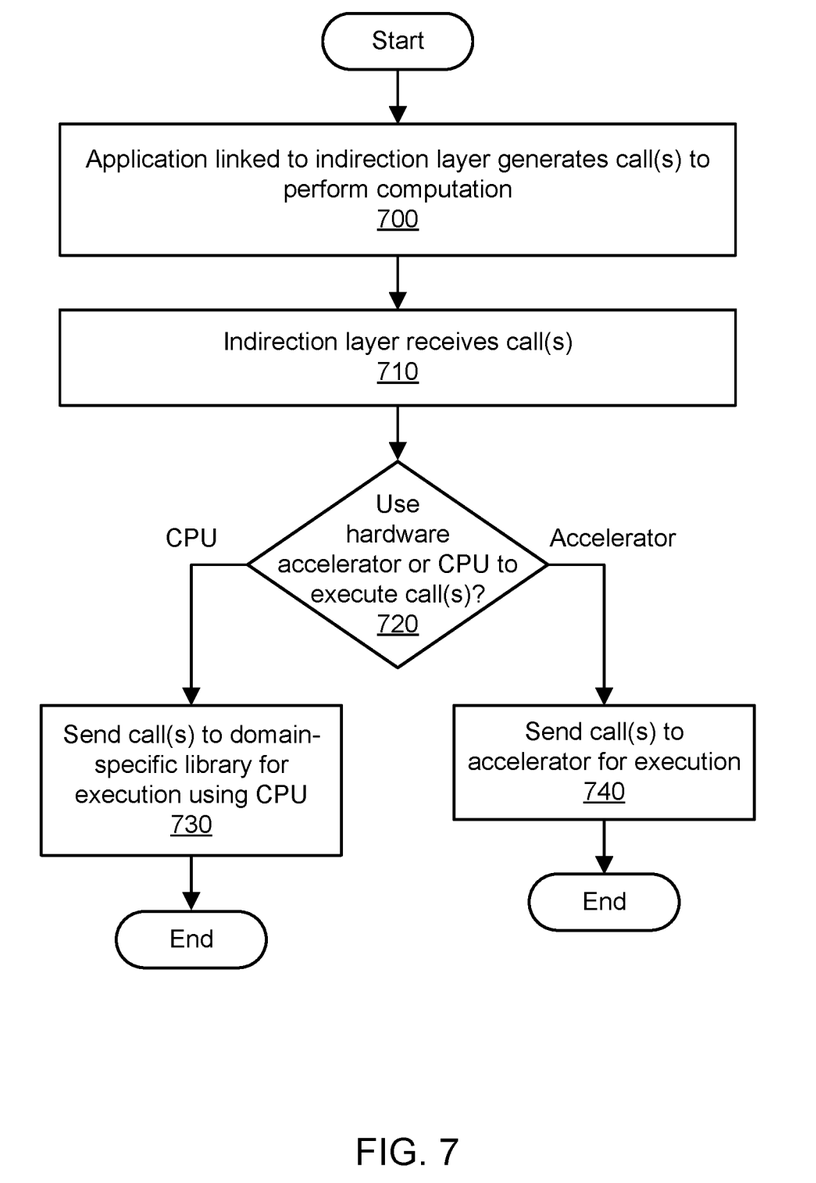
FIG. 7 is a flowchart illustrating a method for dynamic and selective hardware acceleration, according to one embodiment.

FIG. 7 is a flowchart illustrating a method for dynamic and selective hardware acceleration, according to one embodiment. As shown in 700, an application may generate one or more calls to perform computation(s). The application may link to an indirection layer instead of to a domain-specific library, and the call(s) may be passed using an interface associated with the domain-specific library. The library may offer functionality in a particular domain such as linear algebra operations, fast Fourier transforms, digital signal processing, solution of differential equations, cardinality estimation, hashing, other forms of scientific and high-performance computing, and so on. As shown in 710, the indirection layer may receive the call(s). The indirection layer may intercept the call(s) using a façade pattern.

The same or similar functionality as that of the domain-specific library may also be implemented in a hardware accelerator. In one embodiment, the hardware accelerator may represent a field-programmable gate array (FPGA). In one embodiment, the hardware accelerator may represent an application-specific integrated circuit (ASIC). In one embodiment, the hardware accelerator may represent other specialized hardware, e.g., for performing computational tasks in parallel and/or for implementing same-instruction-multiple-data (SIMD) computation. In various embodiments, the accelerator may be integrated with the processor(s) (e.g., on the same die) or the accelerator may be accessed by the processor(s) over a local bus (e.g., within the same computing device). In one embodiment, the accelerator may instead be implemented in a different computing device that is accessed over a network connection. In one embodiment, the computing device may represent a virtual compute instance that is provisioned from a multi-tenant provider network on behalf of a client.

The application, indirection layer, and domain-specific library may be executed using one or more processors (e.g., a CPU) on a computing device. As shown in 720, the indirection layer may decide whether or not to make use of the hardware accelerator or the CPU to execute the call(s). In one embodiment, the hardware acceleration may be performed on a selective basis: some calls may be dispatched to the accelerator, while other calls may be executed using the CPU. In one embodiment, the hardware acceleration may be performed on a dynamic basis: calls may be dispatched to the accelerator or kept on the CPU based (at least in part) on a hardware selection made at run-time. In one embodiment, the hardware selection may be made on a call-by-call basis. In one embodiment, the hardware selection may be performed based (at least in part) on the size of the data associated with a particular call or on other characteristics of a particular call. In one embodiment, the hardware selection may be performed based (at least in part) the estimated time to complete the task using the accelerator in comparison to the estimated time using the CPU. Machine learning techniques may be used to estimate the completion time. In one embodiment, code profiling may be used to implement the hardware selection.

As shown in 730, based on the determination made in 720, one or more call(s) and associated data (representing input to one or more computational tasks) may be sent to the domain-specific library for execution using the CPU. The computational task(s) associated with the call may be executed using the data and using the processor(s) 140, and results may be returned to the indirection layer and potentially back to the application 110. As shown in 740, based on the determination made in 720, one or more call(s) and associated data (representing input to one or more computational tasks) may be sent to the hardware accelerator for execution. The computational task(s) associated with the call may be executed using the data and using the accelerator, and results may be returned to the indirection layer and potentially back to the application. Using the operations shown in 700-740, by simply linking an application to the indirection layer instead of the domain-specific library, a software developer may achieve significantly faster processing of computational tasks by gaining access to a hardware accelerator that implements the same or similar functionality as the library.

Figure 8:
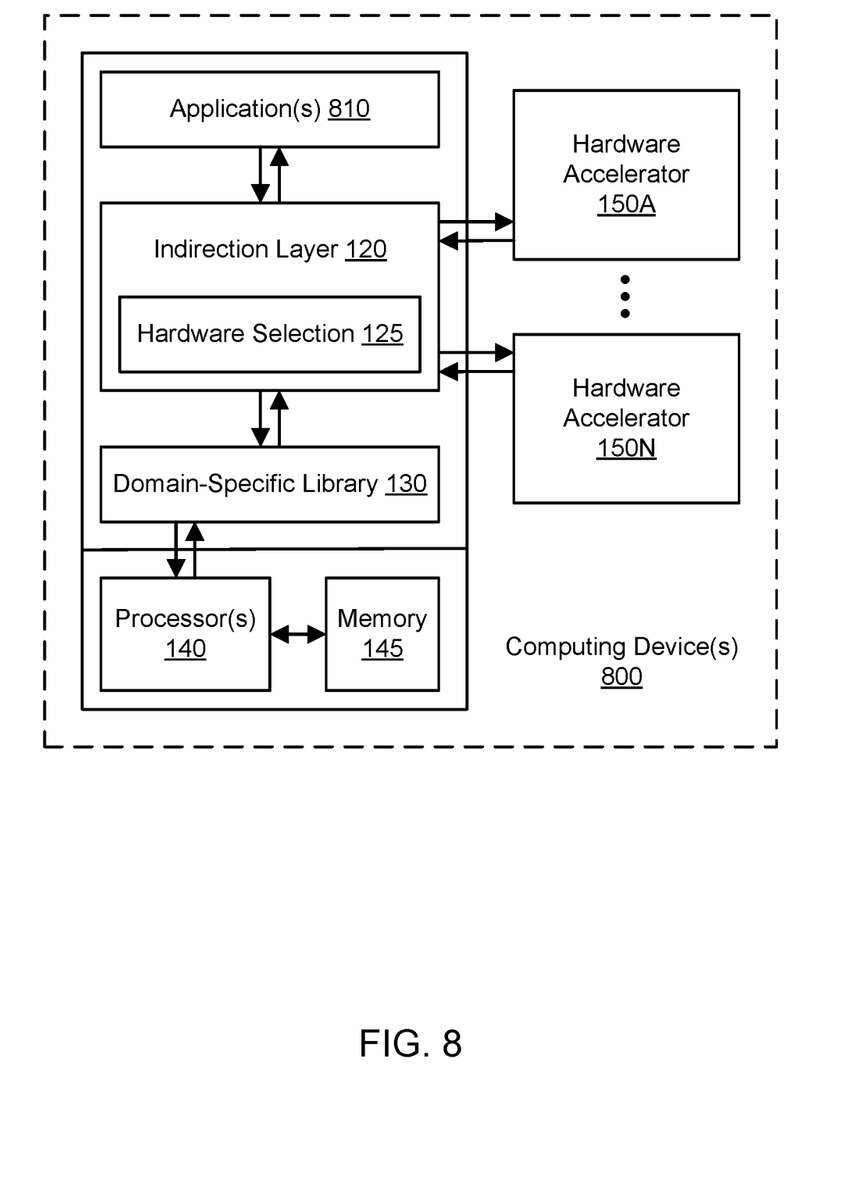
FIG. 8 illustrates an example computing device for dynamic and selective hardware acceleration, including multiple hardware accelerators used by a single indirection layer, according to one embodiment.

FIG. 8 illustrates an example computing device for dynamic and selective hardware acceleration, including multiple hardware accelerators used by a single indirection layer, according to one embodiment. In some embodiments, a set of multiple hardware accelerators (such as accelerators 150A through 150N) may be used for dynamic and selective hardware acceleration with one indirection layer or with one set of processor(s) 140. The accelerators 150A-150N may be integrated with the processor(s) 140, accessible over a local bus such as PCIe (as shown in FIG. 2), or accessible over a network (as shown in FIG. 6). Accordingly the processor(s) 140 and accelerators 150A-150N may be implemented in one or more computing devices 800. If the accelerators 150A-150N include FPGAs, then the FPGA programming on the various accelerators may be the same (e.g., for an increased degree of parallelism for the same type of operations) or may vary. For example, one or more application(s) 810 running on the CPU may request computation in multiple different computing domains, and so the accelerators 150A-150N may implement hardware acceleration in those domains. As discussed with reference to FIG. 5, FPGA images for the accelerators 150A-150N may be selected from a marketplace of such images, and the FPGA programming for any of the accelerators may be switched dynamically to meet the needs of the application(s) 810.

Illustrative Computer System

In at least some embodiments, a computer system that implements a portion or all of one or more of the technologies described herein may include a computer system that includes or is configured to access one or more computer-readable media. FIG. 9 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   at least one processor and a memory storing program instructions executable by the at least one processor, wherein the at least one processor and the memory are hosted in a computing device in a multi-tenant provider network, wherein the program instructions comprise an application and an indirection layer, wherein the application is executable to generate computation calls, and wherein the application links to the indirection layer; and
   a hardware accelerator in the multi-tenant provider network; and
   wherein the indirection layer is executable by the at least one processor to:
      determine whether to execute individual ones of the computation calls using the at least one processor or using the hardware accelerator;
      wherein for a particular computation call of the computation calls, the indirection layer is configured to:
         send the particular computation call to be separately executed by both the at least one processor and the hardware accelerator; and
         compare a first result of execution of the particular computation call by the hardware accelerator to a second result of execution of the particular computation call by the at least one processor; and
      send one or more other ones of the computation calls and associated data to the hardware accelerator, wherein the one or more other ones of the computation calls are executed by the hardware accelerator using the associated data, and wherein one or more results of the one or more other ones of the computation calls are returned from the hardware accelerator to the indirection layer.

2. The system as recited in claim 1, wherein the hardware accelerator comprises a field-programmable gate array (FPGA) or an application-specific integrated circuit (ASIC).

3. The system as recited in claim 1, wherein, in determining whether to execute the individual ones of the computation calls using the at least one processor or using the hardware accelerator, the indirection layer is executable by the at least one processor to perform the determining based at least in part on a size of the associated data compared to a threshold size for the selective utilization of the hardware accelerator.

4. The system as recited in claim 1, wherein the indirection layer is executable by the at least one processor to:
   initiate execution of the one or more of the computation calls using the at least one processor; and
   compare the one or more results of the one or more of the computation calls from the hardware accelerator to one or more results of the one or more of the computation calls from the at least one processor.

5. A computer-implemented method, comprising:
- receiving, at a library, a plurality of calls generated by an application, wherein the application and the library are executed by at least one processor of a computing device, and wherein the application links to the library;
- using the library, determining whether to execute individual ones of the calls using the at least one processor or using one or more hardware accelerators;
- executing a particular call of the calls on both the at least one processor and on the one or more hardware accelerators;
- comparing a first result of executing the particular call on the one or more hardware accelerators to a second result of executing the particular call on the at least one processor; and
- sending one or more other ones of the calls and associated data to the one or more hardware accelerators, wherein the one or more other ones of the calls are executed by the one or more hardware accelerators using the associated data, and wherein one or more results of the one or more other ones of the calls are returned from the one or more hardware accelerators to the library.

6. The method as recited in claim 5, wherein the one or more hardware accelerators comprise a field-programmable gate array (FPGA).

7. The method as recited in claim 5, wherein the one or more hardware accelerators comprise an application-specific integrated circuit (ASIC).

8. The method as recited in claim 5, wherein determining whether to execute the individual ones of the calls using the at least one processor or using the one or more hardware accelerators comprises estimating a time of completion using the at least one processor and a time of completion using the one or more hardware accelerators based at least in part on monitoring of a plurality of prior calls.

9. The method as recited in claim 5, wherein determining whether to execute the individual ones of the calls using the at least one processor or using the one or more hardware accelerators comprises determining a current availability of the one or more hardware accelerators based at least in part on a history of calls sent to the one or more hardware accelerators and not completed.

10. The method as recited in claim 5, wherein the computing device represents a virtual compute instance offered by a multi-tenant provider network.

11. The method as recited in claim 5, wherein determining whether to execute the individual ones of the calls using the at least one processor or using the one or more hardware accelerators is performed based at least in part on a size of the associated data compared to a threshold size for the selective utilization of the one or more hardware accelerators.

12. The method as recited in claim 5, further comprising:
- using the at least one processor to execute the one or more of the calls; and
- comparing the one or more results of the one or more of the calls from the one or more hardware accelerators to one or more results of the one or more of the computation calls from the at least one processor.

13. A non-transitory computer-readable storage medium storing program instructions computer-executable to perform:
- receiving, at a library, a plurality of computation calls generated by an application, wherein the application and the library are executed by at least one processor of a computing device in a multi-tenant provider network, and wherein the application links to the library;
- using the library, determining whether to execute individual ones of the computation calls using the at least one processor or using a hardware accelerator;
- executing a particular computation call of the computation calls by both the at least one processor and the hardware accelerator;
- comparing a first result of executing the particular computation call by the hardware accelerator to a second result of executing the particular computation call by the at least one processor; and
- sending one or more other ones of the computation calls and associated data to the hardware accelerator, wherein the one or more other ones of the computation calls are executed for the associated data using the hardware accelerator, and wherein one or more results of the one or more of the computation calls are returned from the hardware accelerator to the library.

14. The non-transitory computer-readable storage medium as recited in claim 13, wherein the hardware accelerator comprises a field-programmable gate array (FPGA).

15. The non-transitory computer-readable storage medium as recited in claim 14, wherein an FPGA image including programming for the FPGA is selected from a marketplace associated with the multi-tenant provider network, the marketplace providing access to a plurality of different FPGA images.

16. The non-transitory computer-readable storage medium as recited in claim 15, wherein a different FPGA image including additional programming for the FPGA is selected from the marketplace, and wherein the FPGA is reprogrammed from the programming to the additional programming.

17. The non-transitory computer-readable storage medium as recited in claim 13, wherein the hardware accelerator comprises an application-specific integrated circuit (ASIC).

18. The non-transitory computer-readable storage medium as recited in claim 13, wherein the hardware accelerator is hosted in the computing device and accessed by the at least one processor over a local bus.

19. The non-transitory computer-readable storage medium as recited in claim 13, wherein the hardware accelerator is hosted in an additional computing device in the multi-tenant provider network and accessed by the computing device over a network connection.

20. The non-transitory computer-readable storage medium as recited in claim 13, wherein the hardware accelerator is integrated with the at least one processor in the computing device.

* * * * *